Figure 2:
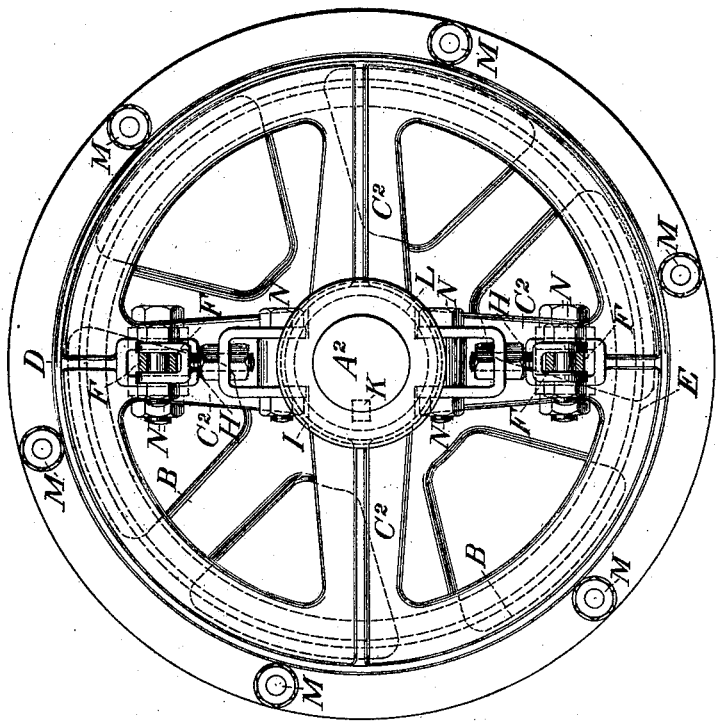

(No Model.)

H. P. CHRISTIE.
FRICTION COUPLING.

No. 472,432. Patented Apr. 5, 1892.

Witnesses:
E. A. Brandau
W. D. Bent, Jr.

Inventor:
Henry P. Christie
By his Atty
John Richards

UNITED STATES PATENT OFFICE.

HENRY P. CHRISTIE, OF SAN FRANCISCO, CALIFORNIA.

FRICTION-COUPLING.

SPECIFICATION forming part of Letters Patent No. 472,432, dated April 5, 1892.

Application filed October 29, 1891. Serial No. 410,200. (No model.)

*To all whom it may concern:*

Be it known that I, HENRY P. CHRISTIE, a citizen of the United States, residing at San Francisco, county of San Francisco, and State of California, have invented certain new and useful Improvements in Friction-Couplings; and I hereby declare the following to be a full, clear, and exact description of the same, reference being had to the accompanying drawings, forming a part of this specification.

My invention relates to friction-couplings for connecting and disconnecting the ends of shafts, and is in some of its features analogous to an improvement in friction-clutches for engaging and disengaging pulleys and wheels for which Letters Patent of the United States No. 462,623 were granted to me on November 3, 1891.

My present invention consists in applying on the end of one of the shafts to be connected a flange or wheel having an overhung double-grooved rim, the grooves preferably of angular form. On the other shaft I employ two laterally-adjustable flanges or wheels, having angular ledges fitting into the two grooves of the grooved rim before named. To operate these last-named adjustable flanges or wheels, I employ a double-toggle lever, a bell-crank, and links that cause the angular faces to be pressed together equally and uniformly, so that all the strains are inherent and balanced, as between the two opposite grooves, and the frictional surface as well as the tractile force thereof are double what they would be in the case of a single groove and a single ledge fitting therein, also attaining the further object of producing a true alignment of the two shafts by means of my improved coupling when the shafts are connected and both in motion.

The manner of constructing and applying my invention is illustrated in the accompanying drawings, in which—

Figure 1:
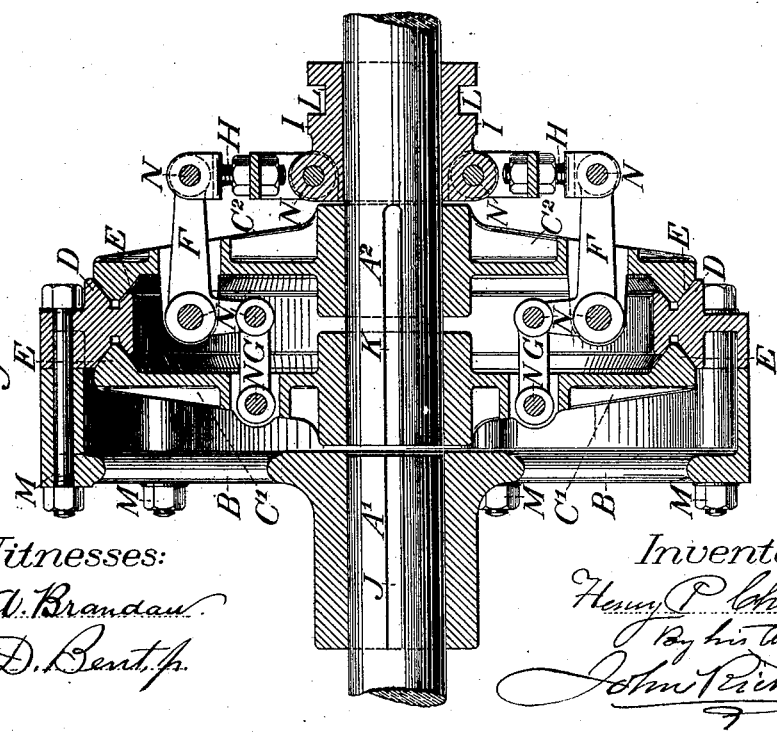

Figure 1 is a longitudinal section through the center of one of my improved friction-couplings, and Fig. 2 is a side view of the same.

Similar letters of reference are employed on the two figures to indicate corresponding parts thereof.

A' and A² are two shafts to be connected; B, the fixed flange or wheel keyed on one shaft; C' C², two adjustable flanges or wheels on the other shaft; D, the overhung double-grooved ring on the fixed flange; E E, angular ledges on the adjustable flanges; F, toggle-levers or bell-cranks for operating the coupling; G, links for connecting the toggle-levers to inner adjustable flange; H, adjustable strut to operate the toggle-levers; I, fulcrum-collar for operating the toggle-levers; J, key for fastening the fixed flange or wheel; K, feather for holding the adjustable flanges to the shaft; L, groove where adjusting mechanism is applied; M, screw-bolts for attaching the double-grooved ring; N, fulcrum pins or screws in the toggle-joints.

The flange or wheel B is keyed firmly on the shaft A', and may be of plate form or made with spokes, as the size or other reasons may determine. This flange or wheel is flanged at its periphery and provided with bosses for the bolts M, which hold the double-grooved ring D, or this ring can be made integral with the flange or wheel B if that method is preferred. This ring D is overhung beyond the end of the shaft A', so as to provide room for the adjustable flange C', which is covered by the flange of the wheel B, as shown in Fig. 1.

The two flanges C' and C² fit loosely on the shaft A² and slide on the feather or key K, which is embedded in the shaft in the usual manner.

The angular faces E E of the flanges C' C² fit into corresponding grooves in the ring D when engaged, as shown in the drawings. Pressure is applied to these flanges C' and C² by means of the members F, G, H, and I, constituting an ordinary toggle-lever joint, except that there are no fixed fulcrums.

The bell-crank F, when its longest limb is thrust outward by the strut H, exerts an equal and balanced thrust in opposite directions on the plates or flanges C' and C², so that the angular ledges E E nip the ring D with a force proportionate to the thrust of the strut H. In this engaged position it will be seen that the two shafts A' A² are held rigidly concentric with each other, as well as connected by the frictional surfaces before described.

To release the clutch and disengage the shafts A' A², the fulcrum-collar I is drawn back by means of a loose collar in the groove L, operated by a lever or in any other manner. This shortens the strut H by reason of its diagonal position, and by means of the toggle-lever F pushes the plates or wheels C' and C² apart and thus releases the frictional surfaces E, disengaging the two shafts A' and A².

It will be seen that when the shafts are disconnected there are no running joints or bearings, except of a loose collar at L, when the shaft A² is in motion. It will also be understood that the periphery of the wheel or flange B can be arranged to receive a band and thus perform the office of a pulley or be provided with teeth as a gear-wheel when either of these are required.

Having thus described the nature of my invention and its objects, what I claim as new, and desire to secure by Letters Patent, is—

In a friction-coupling, the combination of the two shafts A' and A², the fixed wheel B, keyed on the shaft A', said fixed wheel having a peripheral flange, a double-grooved ring D, secured to this flange by means of bolts M, the adjustable flanges or wheels C' C², which slide upon the other shaft, said wheels having the angular ledges E E, the mechanism for operating the sliding flanges C' C², consisting of the toggles or bell-crank levers F F, links G for connecting the bell-cranks F to the wheel C', adjustable strut H, and fulcrum-collar I, having groove L, all arranged to operate substantially in the manner and for the purpose specified.

In testimony whereof I have hereunto affixed my signature in the presence of two witnesses.

HENRY P. CHRISTIE.

Witnesses:
ALFRED A. ENQUIST,
WILSON D. BENT, Jr.